UNITED STATES PATENT OFFICE.

RENÉ BOHN, OF MANNHEIM, GERMANY, ASSIGNOR TO THE BADISCHE ANILIN & SODA FABRIK, OF LUDWIGSHAFEN, GERMANY.

BLUE DYE OF NAPHTHALENE SERIES AND PROCESS OF MAKING SAME.

SPECIFICATION forming part of Letters Patent No. 669,894, dated March 12, 1901.

Application filed April 11, 1899. Serial No. 712,632. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of Blue Coloring-Matter of the Naphthalene Series, (for which applications for patents have been made in Germany, filed September 16, 1898, No. B 23,420; in England, filed November 23, 1898, No. 24,752, and in France, filed November 28, 1898, No. 271,355,) of which the following is a specification.

In United States Patent No. 631,614, granted August 22, 1899, there is described the production of a leuco compound from the body known in chemical literature as "naphthazarin" intermediate product. In United States Patent No. 627,896, granted June 27, 1899, the conversion of the said leuco compound into new blue coloring-matter having the nature of a sulfo-acid is described.

My present invention relates to the manufacture of a blue coloring-matter which is but difficultly soluble in cold water by boiling the said sulfonated coloring-matter of the said Patent No. 627,896 with anilin hydrochlorate or the hydrochlorate of an equivalent aromatic amin in aqueous solution.

The following example will serve to illustrate the nature of the invention and the manner in which it is best carried into practical effect.

Dissolve about ten (10) parts of the aforesaid sulfonated coloring-matter of the said Patent No. 627,896 in about five hundred (500) parts of boiling water and add to the solution about twenty (20) parts of anilin hydrochlorate. Boil the mixture so obtained for about two hours. It is at first blue, but turns in color to a violet red. Allow the mixture to cool. The new coloring-matter crystallizes out. Collect in the usual way and dry.

My new coloring-matter dyes unmordanted wool from the acid-bath, giving blue shades, which possess an excellent degree of fastness to light. It may occur as a brown powder showing a metallic luster. It is but difficultly soluble in cold water, but more soluble in hot water, giving a violet-blue solution, which solution becomes a pure-blue color on addition of dilute caustic-soda solution and on addition of sulfuric acid becomes of a magenta color. The solution in concentrated sulfuric acid is violet, which on warming becomes of a magenta color, and in ethyl alcohol the solution is violet. In aqueous caustic-soda and in anilin blue solutions are obtained.

As instances of equivalent aromatic amins to the anilin used in the foregoing example I mention ortho- and para- toluidin, and the hydrochlorates of these bodies can be substituted for the hydrochlorate of anilin used in the said example.

Now what I claim is—

1. The process for the manufacture of new blue coloring-matter which consists in heating an aqueous solution of a sulfonated leuco compound of the naphthazarin intermediate product with anilin hydrochlorid, all substantially as described.

2. As a new product the blue coloring-matter which can be derived from the hereinbefore-described sulfonated leuco compound of the naphthazarin intermediate product and the hydrochlorid of an aromatic amin and which gives a violet-blue solution with water which solution on addition of dilute caustic-soda solution is changed to blue; with ethyl alcohol it gives a violet solution, with concentrated sulfuric acid it gives a violet color which becomes red on heating and it gives a blue solution with anilin, all substantially as described.

3. As a new product the blue coloring-matter which can be derived from the hereinbefore-described sulfonated leuco compound of the naphthazarin intermediate product and the hydrochlorid of anilin and which gives a violet-blue solution in water which solution on addition of dilute caustic-soda solution is changed to blue; with ethyl alcohol it gives a violet solution, with concentrated sulfuric acid it gives a violet color which becomes red on heating and it gives a blue solution with anilin, all substantially as described.

In testimony whereof I have hereunto set my hand in the presence of two subscribing witnesses.

RENÉ BOHN.

Witnesses:
ERNEST F. EHRHARDT,
J. L. HEINKE.